(12) United States Patent
Bruno et al.

(10) Patent No.: US 8,260,861 B1
(45) Date of Patent: *Sep. 4, 2012

(54) SYSTEM AND METHOD FOR AN ELECTRONIC MAIL ATTACHMENT PROXY

(75) Inventors: Aurelien Bruno, Nice (FR); Nicolas Grisi, La Colle sur Loup (FR); Didier Giroir, Cagnes sur Mcr (FR); Olivier Hericourt, La Gaude (FR); Jean-Francois Le Pennec, Nice (FR)

(73) Assignee: AT & T Intellectual Property II, LP, Atlanta, GA (US)

( * ) Notice: Subject to any disclaimer, the term of this patent is extended or adjusted under 35 U.S.C. 154(b) by 794 days.

This patent is subject to a terminal disclaimer.

(21) Appl. No.: 11/218,063

(22) Filed: Aug. 31, 2005

(51) Int. Cl.
*G06F 15/16* (2006.01)
(52) U.S. Cl. .......................................... 709/206; 726/24
(58) Field of Classification Search .................. 709/206; 726/24

See application file for complete search history.

(56) References Cited

U.S. PATENT DOCUMENTS

| | | | |
|---|---|---|---|
| 5,818,447 A | 10/1998 | Wolf et al. | |
| 6,505,236 B1 * | 1/2003 | Pollack | 709/206 |
| 6,598,076 B1 | 7/2003 | Chang et al. | |
| 6,839,741 B1 | 1/2005 | Tsai | |
| 6,898,622 B1 | 5/2005 | Malik | |
| 7,035,902 B1 * | 4/2006 | Bates et al. | 709/206 |
| 7,113,948 B2 * | 9/2006 | Jhingan et al. | 1/1 |
| 7,257,639 B1 * | 8/2007 | Li et al. | 709/232 |
| 2003/0055907 A1 * | 3/2003 | Stiers | 709/206 |
| 2003/0158949 A1 * | 8/2003 | Miller et al. | 709/229 |
| 2004/0128355 A1 * | 7/2004 | Chao et al. | 709/206 |
| 2004/0221014 A1 * | 11/2004 | Tomkow | 709/206 |
| 2005/0005160 A1 * | 1/2005 | Bates et al. | 713/200 |
| 2005/0076082 A1 * | 4/2005 | Le Pennec et al. | 709/206 |
| 2006/0218234 A1 * | 9/2006 | Deng et al. | 709/206 |

* cited by examiner

*Primary Examiner* — Duyen Doan
(74) *Attorney, Agent, or Firm* — Fay Kaplun & Marcin, LLP

(57) ABSTRACT

Described is a system and method for receiving an electronic mail including an attachment file and separating the attachment file from the electronic mail. The attachment is then sent to a remote source and the attachment file is replaced with a substitute file including identifying data for retrieving the attachment file from the remote source. The electronic mail with the substitute file is then forwarded to a receiver.

11 Claims, 2 Drawing Sheets

SYSTEM AND METHOD FOR AN ELECTRONIC MAIL ATTACHMENT PROXY

BACKGROUND

Files attached to electronic mail ("email") present several drawbacks. Email attachments are often large files and tend to overload user's mailboxes. Large files often slow down email replication on low speed links (e.g., dial-up or wireless GSM connections) and thereby increase the time to get all the email replicated locally. Uncompressed attachment files increase this drawback. Furthermore, all recipients of an email with a large attachment will have this file in their mailbox (e.g., on a local hard disk). This proliferates the large file and may cause massive amounts of memory to be used if the same file is distributed to multiple users. User's mailbox size is usually limited and emails with large files attached thereto create a need to manage emails and archive very often. In addition, email attachments may not be secure, e.g., the files may include viruses or contain forbidden data. All Internet Service Providers ("ISPs"), email users and associated servers face this problem. A need exists to handle email attachments more effectively.

SUMMARY OF THE INVENTION

A method for receiving an electronic mail including an attachment file and separating the attachment file from the electronic mail. The attachment is then sent to a remote source and the attachment file is replaced with a substitute file including identifying data for retrieving the attachment file from the remote source. The electronic mail with the substitute file is then forwarded to a receiver.

An electronic mail server having a receiving module to receive an electronic mail including an attachment file, a separating module to separate the attachment file from the electronic mail, a sending module to send the attachment file to a remote source, a replacement module to replace the attachment file with a substitute file including identifying data for retrieving the attachment file from the remote source and a forwarding module to forward the electronic mail with the substitute file to a receiver.

A system having an electronic mail server receiving an electronic mail including an attachment file and separating the attachment file from the electronic mail. The system further including a remote source receiving the attachment file from the electronic mail server, wherein the electronic mail server replaces the attachment file with a substitute file including identifying data for retrieving the attachment file from the remote source and forwards the electronic mail with the substitute file to a receiver.

DETAILED DESCRIPTION

Figure 1:
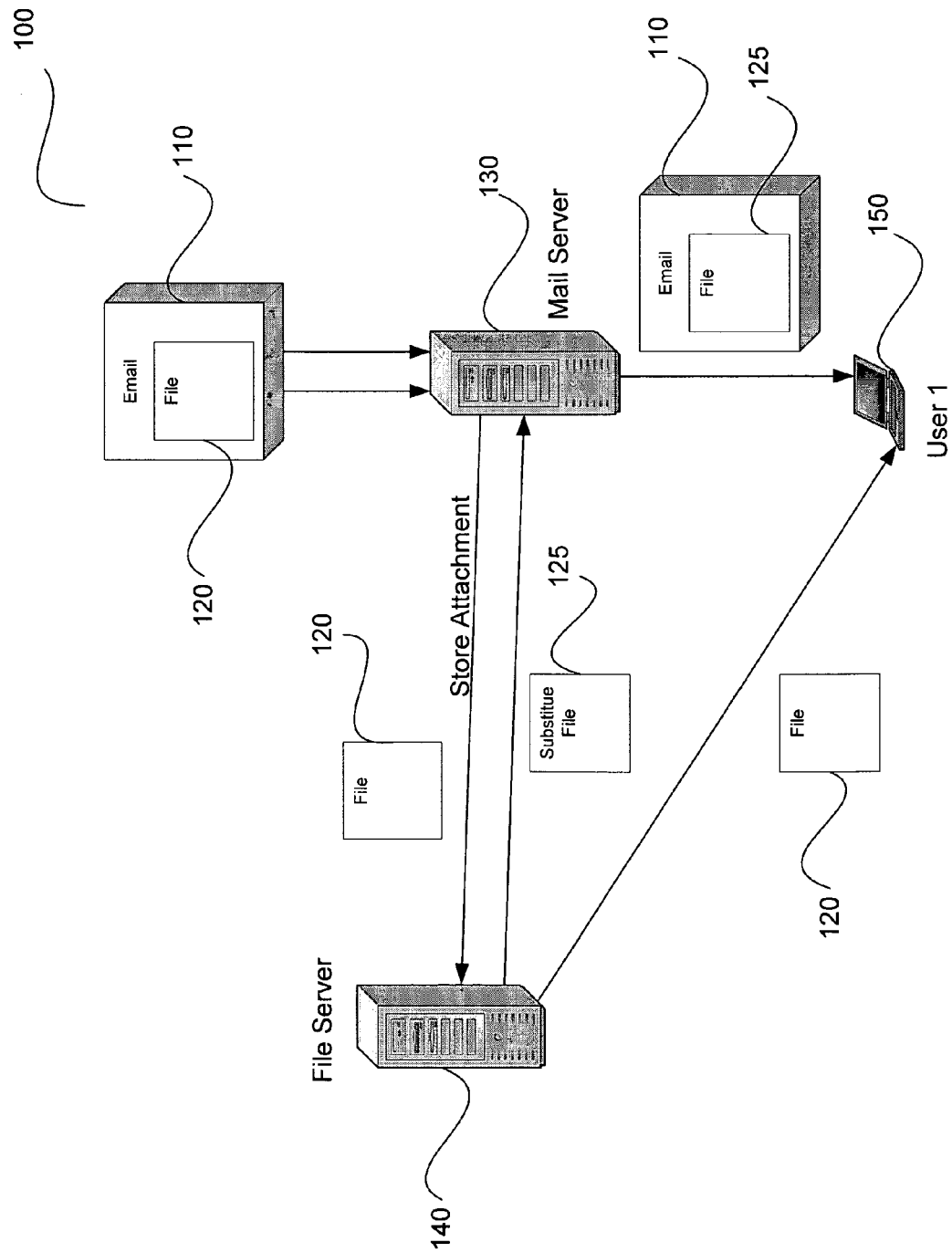
FIG. 1 is an exemplary schematic diagram of a system according to the present invention.

The exemplary embodiments of the present invention present a system and method for handling emails with attachments based on the use of a separate server to store all attachments (or those attachments that are greater than a defined size). Email attachments are removed when especially large or dangerous emails are received. The emails may be received via any network capable of transmitting and receiving emails, e.g., the Internet, a private intranet, etc. Thus, it should be noted that the systems and methods of the present invention described herein may be applied to any network over which emails may be exchanged.

In a preferred embodiment, the exemplary methods of the present invention are implemented via an email server. Any type of email server may be used to implement the exemplary embodiments of the present invention. Commercially available email servers include the Microsoft Exchange Server and the Lotus Domino Mail Server. However, the present invention is not required to be implemented on an email server. The exemplary methods described herein may be implemented in other software and/or hardware which interacts with electronic mail as it travels from its source to its destination.

When implemented by an email server, an "email attachment" removal/replacement function may be performed, for example, at transmission time for an SMTP server, at reception time by servers like POP servers, or in email proxy servers at the boundary of a network. In the exemplary embodiments, the attachments are stored in a file server, such as a web server, or a plurality of file servers for geographic or backup purpose. The file server may then run other processes on the stored attachments, e.g., virus checking, file compression, etc. The file server may be considered an attachment proxy for emails. In this manner, only one version of an attachment file is maintained, even when destined for multiple users. Thus, only one copy of the attachment file may be kept in the file server for all "send to" email identifications (recipients), thereby providing the advantage of saving a significant amount of space in email servers and also in the global storage. The recipients may retrieve the attachment file by providing the file server with a verification, for example, file name, size and file identifier such as a signature (file hashing) and optionally providing a user identifier such as an email ID.

The exemplary embodiments of the present invention includes an electronic mail system that can separate an email attachment from the electronic mail and then send the attachment to a remote source, such as a file server. The mail server replaces the attachment with a substitute file containing identifying data and forwards the electronic mail with the substitute file to a recipient that uses the identifying data to obtain the attachment from the remote source.

The file server is adapted to build the substitute file upon receiving the electronic mail with the attachment. In one embodiment, the mail server sends the attachment to a file server in exchange for the substitute file. In another embodiment, the substitute file includes a hash value computed from the attachment. The hash value is used as a file signature in combination with the identifying data by the receiver to obtain the attachment from the remote source. Further, the present invention provides for the file server to have a distribution list of users authorized to obtain the attachment. The distribution list is provided by the electronic mail server to the remote source during the substitute file creation.

Referring to FIG. 1, an exemplary schematic diagram of a system 100 implementing the email attachment proxy of the present invention is shown. An email 110 with an attachment file(s) 120 is sent to and received by a mail server 130. Those of skill in the art will understand that the mail server generally refers to a software package that is executed by a processor of a hardware device (e.g., a network server) and the hardware server shown in FIG. 1 is only for illustrative purposes. In this example, the exemplary embodiment is being described as being implemented on the receiving mail server. However, as described above, the present invention may be implemented in the transmitting mail server and/or an intermediate mail server.

The mail server 130 separates the attachment file(s) 120 from the email 110 and sends the attachment file 120 to a file server 140. Again, the file server 140 may be any combination of hardware and/or software that allows for the storage of the attachment file 120. In addition, the file server 140 may include hardware and/or software to perform additional functions as will be described in greater detail below. The file server 140 may be in the same physical location as the mail server 130 or may also be in a remote location.

The file server 140 stores the attachment file 120 and builds a substitute file 125 using information from the attachment file 120. The substitute file 125 will be described in greater detail below. The substitute file 125 is returned to the mail server 130 and replaces the attachment file 120 in the electronic mail 110. The email 110 with the substitute file 125 is forwarded to an individual user or user group 150 by the mail server 130. The user 150 retrieves the email 110 with the substitute file 125 in the normal manner.

The substitute file 125 includes data that identifies the original attachment file(s) 120. This data enables the user 150 to obtain the original attachment file(s) 120 from the file server 140. In one exemplary embodiment, the substitute file 125 contains identifying data which allows a user to retrieve the attachment file 120 from the file server 140 upon receiving the electronic mail 110. The identifying data may include, for example, the name of the attachment file 120 and its storage location (e.g., file server 140). Any other type of identifying data that allows the user 150 to retrieve the attachment file 120 from the file server 140 may be included in the substitute file 125. The user 150 may then use this information to retrieve the original attachment file 120 from the file server 140.

In another exemplary embodiment, the substitute file 125 may include a hash value that is computed from the attachment file 120 using well known methods. The hash value may be used as a file signature in combination with the identifying data to obtain the attachment file 120 from the file server 140.

In a further exemplary embodiment, the substitute file 125 may be a Universal Resource Locator ("URL") link to a location where the attachment file 120 is stored. A secure SSL connection may be defined in the URL link. Those of skill in the art will understand that the substitute file 125 does not need to be a separate attachment to the email 110. For example, where the substitute file 125 is a URL link, the substitute file 125 in the form of the URL link may be embedded within the email 110, i.e., added into the body of the email 110. Other types of substitute files 125 may also be embedded within the body of the email 110.

One of the advantages of the above described system is that it allows certain operations or processes to be performed on the attachment file 120 when it is stored in the file server 140. In a first example, the file server 140 may include anti-virus software which can be used to scan the attachment file 120 for viruses or other types of data (e.g., pornographic content, etc.) which should not be forwarded to the user 150. If the file server 140 determines that the attachment file 120 has such prohibited content, the file server 140 may embed the information in the substitute file 125 to inform the user 150 that an attachment file 120 was received, but that it contained prohibited content (e.g., a virus) and therefore the user 150 will not have access to the attachment file 120. In another embodiment, the information may not be included in the substitute file 125, but rather when the user 150 attempts to retrieve the attachment file 120 from the file server 140, the user 150 will be informed that the attachment file 120 is not available because of the prohibited content.

Another example of functionality that may be provided on the file server 140 may be a file comparison utility. Since all incoming and/or outgoing attachment files will be stored on the file server 140, attachment files may be compared to determine if there are multiple copies of the same file, e.g., the same file was attached to more than one email by the same or a different user. If the file comparison utility determines that a newly stored file is the same as a previously stored file, one of the copies of the file may be deleted, thereby saving storage space. Those of skill in the art will understand that the reference to the location of the attachment file in the substitute file may have to be revised according to the actual storage location of the file.

A further example of functionality that may be provided on the filer server 140 is a file compression utility. This utility may be used to compress all incoming attachment files to save space, bandwidth and transmission time. Those of skill in the art will understand that any number of other types of functionality may be provided on the file server 140 in order to more efficiently process emails having attachment files. The file server 140 facilitates these processes by storing the attachment files in a central location.

Figure 2:
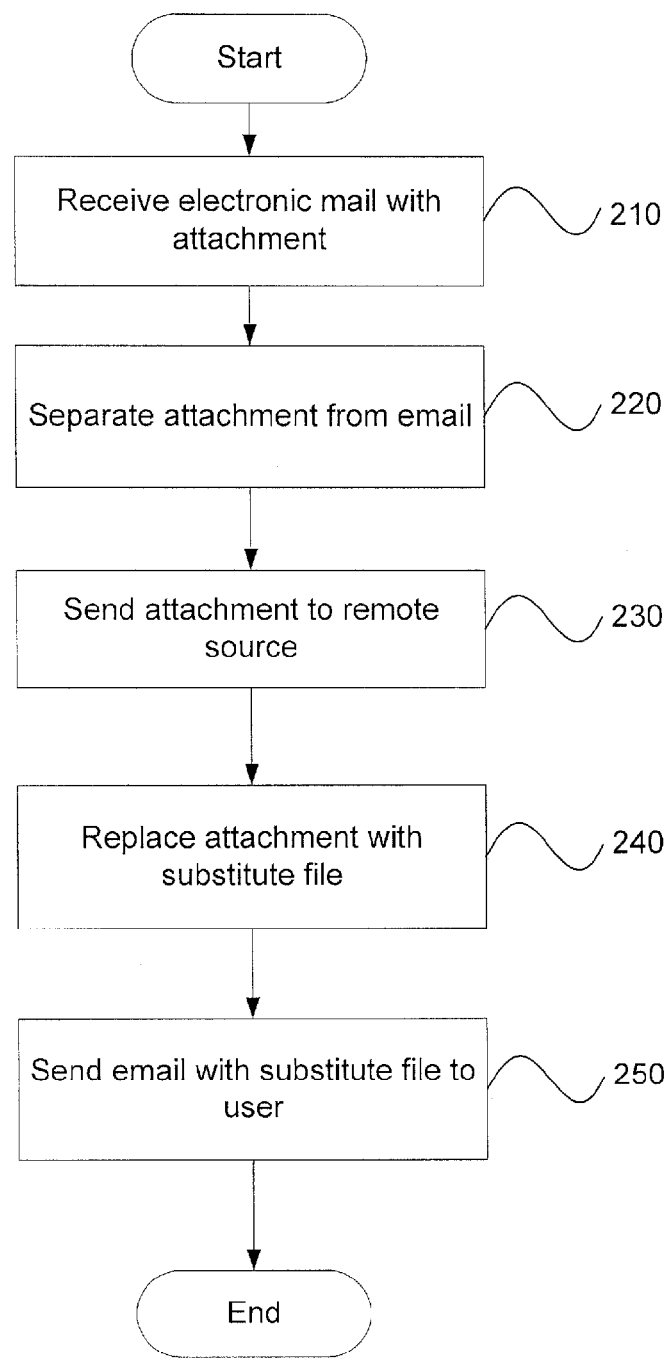
FIG. 2 is an exemplary method of handling email attachments according to the present invention.

FIG. 2 shows an exemplary method 200 for handling emails with attachment files. The method 200 will be described with reference to the system 100 of FIG. 1. In step 210, an email 110 with an attachment file 120 is received by a mail server 130. As described above, the mail server 130 may be a receiving mail server, a transmitting mail server or any intermediate mail server in the routing of the email 110. Those of skill in the art will understand that an email when sent from a sender to a recipient may travel through various devices and networks on its path from sender to recipient. This path may include any number of mail servers that are used to handle the email so that it reaches it proper destination.

In step 220, the mail server 130 separates the attachment file 120 from the email 110. As described above, a size threshold may be set on the mail server 130, where only attachment files above a predetermined size are separated. For example, where an individual attaches their electronic business card to an email, the size may be set on the mail server that these type of very small attachment files are not separated and handled according to the exemplary method of the present invention. The size threshold may be set to any value, including zero, meaning that all attachment files will be handled according to exemplary method.

In step 230, the attachment file 120 is sent to a remote source, such as the file server 140. Those of skill in the art will understand that in the above description, the remote source has been described as file server 140. However, the remote source is not limited to a file server device. The remote source could be any hardware and/or software or combination thereof, which can store the attachment files and perform the other functions described herein for the remote source.

In step 240, the attachment file 120 is replaced with a substitute file 125 by the mail server 130. As described above, the substitute file 125 will include identifying data that may be used by the user 150 to retrieve the attachment file 120 from the file server. The substitute file 125 may be created by the file server 140 and be sent to the mail server 130. In an alternative embodiment, the information (or some of the information) for creating the substitute file 125 may be sent by the file server 140 to the mail server 130 and the mail server 130 may then create the substitute file 125. In any case, the substitute file 125 is then substituted into the email 110.

In step 250, the email 110 with the substitute file 125 is then forwarded to the user(s) 150. The user 150, when opening the email 110, may also open the substitute file that includes the identifying data for accessing the attachment file 120. The user 150 may use this identifying data to retrieve the attachment file 120 from the file server 140. Examples of various identifying data have been provided above and may include, for example, a filename of the attachment file, a file type of the attachment file, a summary of the attachment file, a table of contents for the attachment file, a file size of the attachment file, a storage location on the file server for the attachment file, a user ID such as an email ID with or without a password to access the attachment file or any other well known security mechanism including user and file digital certificates, a URL link to the attachment file, a file identifier such as a file signature to gain access to the attachment file, etc. In another embodiment, the file server 140 may have a distribution list of users authorized to obtain the attachment. The distribution list may be provided by the email server 130 to the file server 140, for example, during the substitute file creation.

The exemplary embodiments of the present invention may be utilized to store and retrieve attachment files from a remote source such as an independent file server. In this manner, a user's mailbox will remain secure and not become overloaded with attachment files. The exemplary system and method also allows for the saving of a large amount of space in current email servers as well as within the user's mailbox. For example, if a single email with a large attachment file is being sent to ten (10) users operating off the same mail server, only a single copy of the attachment file needs to be stored on the independent file server.

In addition, the exemplary embodiments are compatible with any email applications, even those that do not implement the present invention. For example, if the present invention is implemented on the receiving mail server, the transmitting mail server is not affected, i.e., the transmitting mail server sends the email with the attachment file in the normal manner. Where the present invention is implemented on the transmitting mail server, the receiving mail server is also unaffected, i.e., the receiving email server receives the email with the substitute file and handles the received email in the normal manner.

The present invention may also be used to extract complex images from the email (which are not attached) to consider them as attachments and thereby replacing them with a reduced image (based on number of pixels) and using the same mechanism to retrieve the full image. The present invention solves the problems where attachments are either transmitted in emails or emails are discarded by servers because they are too large or not sent to users because the user's mailbox is overloaded. The present invention may be used by email systems vendors, as well as, internal and external use by companies or individuals.

The exemplary methods described herein may be implemented, for example, in software modules that are included as part of the mail server or as separate stand alone software applications that are loaded onto the same hardware or different hardware as the mail server. For example, the exemplary methods that are described with respect to functionality provided by the mail server may be implemented via plug-ins for the mail server. Other manners of implementing the exemplary systems and methods of the present invention will present themselves to those of skill in the art.

The present invention has been described with reference to specific exemplary embodiments. Those skilled in the art will understand that changes may be made in the details of the invention, without departing from the teaching of the invention. Accordingly, various modifications and changes may be made to the embodiments without departing from the broadest scope of the invention as set forth in the claims that follow. The specifications and drawing are, therefore, to be regarded in an illustrative rather than a restrictive sense.

What is claimed is:

1. A non-transitory computer readable storage medium storing a set of instructions executable by a processor, the set of instructions being operable to:
   receive an electronic mail including an attachment file;
   separate the attachment file from the electronic mail when a file size of the attachment file is greater than a predefined size threshold;
   determine whether a remote file server has previously received a copy of the attachment file;
   send the attachment file to the remote file server, if the remote file server has not previously received a copy of the attachment file, the remote file server being adapted to build a substitute file upon receiving the attachment file, the substitute file including a hash value computed from the attachment file, wherein, when the attachment file does not include prohibited content, the substitute file includes identifying data for retrieving one of the attachment file and the copy of the attachment file from the remote file server and wherein, when the attachment file includes prohibited content, the substitute file does not provide access to the attachment file and includes an indication of the prohibited content;
   receive the substitute file from the remote file server;
   replace the attachment file with the substitute file;
   forward the electronic mail with the substitute file to the receiver;
   receive a request from the receiver to obtain the attachment file, the request including the identifying data and the hash file; and
   send the attachment file to the receiver in response to the request.

2. The non-transitory computer readable storage medium of claim 1, wherein the remote file server has a distribution list of users authorized to obtain the attachment file.

3. The non-transitory computer readable storage medium of claim 2, wherein the distribution list is provided by an electronic mail server to the remote file server during the substitute file creation.

4. The non-transitory computer readable storage medium of claim 1, wherein the receiver is a plurality of users.

5. A system, comprising:
   a processor executing a set of instructions for operating an electronic mail server; and
   a memory storing the set of instructions, the set of instructions comprising:
      a receiving module to receive an electronic mail including an attachment file;
      a separating module to separate the attachment file from the electronic mail when a file size of the attachment file is greater than a predefined size threshold;
      a sending module to determine whether a remote file server has previously received a copy of the attachment file and send the attachment file to the remote file server, if the remote file server has not previously received a copy of the attachment file;
      a replacement module disposed at the remote file server to build a substitute file and replace the attachment file with the substitute file, the substitute file including a hash value computed from the attachment file, wherein, when the attachment file does not include prohibited content, the substitute file includes identifying data for retrieving the attachment file from the remote file server and wherein, when the remote file server determines that the attachment file does include prohibited content, the substitute file does not provide access to the attachment file and includes an indication of the prohibited content;

a forwarding module to forward the electronic mail with the substitute file to the receiver; and an attachment serving module receiving a request from the receiver to obtain the attachment file, the request including the identifying data and the hash file, and send the attachment file to the receiver in response to the request.

6. The system of claim 5, wherein the remote file server has a distribution list of users authorized to obtain the attachment file.

7. The system of claim 6, wherein the distribution list is provided by the electronic mail server to the remote source during the substitute file creation.

8. The system of claim 5, wherein the receiver is a plurality of users.

9. A system, comprising:

a network server including a processor and an electronic mail server, wherein the electronic mail server receives an electronic mail including an attachment file and separating the attachment file from the electronic mail when a file size of the attachment file is greater than a predefined size threshold; and a remote file server receiving the attachment file from the electronic mail server, the remote file server further determining whether it has previously received a copy of the attachment file, the remote file server retaining the attachment file if it has not previously received a copy of the attachment file and discarding the attachment file if it has previously recovered a copy of the attachment file, the remote file server building a substitute file from the attachment file, the substitute file including a hash value computed from the attachment file, wherein, when the attachment file does not include prohibited content, the substitute file includes identifying data for retrieving one of the attachment file and the copy of the attachment file from the remote file server and wherein, when the remote file server determines that the attachment file does include prohibited content, the substitute file does not provide access to the attachment file and includes an indication of the prohibited content, wherein the electronic mail server replaces the attachment file with the substitute file and forwards the electronic mail with the substitute file to the receiver, and wherein the remote file server receives a request from the receiver to obtain the attachment file, the request including the identifying data and the hash file, and sends the attachment file to the receiver in response to the request.

10. The system of claim 9, wherein the electronic mail server is one of a receiving mail server and a transmitting mail server.

11. The system of claim 9, wherein the remote source further includes one of a virus checking utility, a file compare utility and a file compression utility.

* * * * *